(12) United States Patent
Song et al.

(10) Patent No.: US 9,274,852 B2
(45) Date of Patent: Mar. 1, 2016

(54) APPARATUS AND METHOD FOR MANAGING VIRTUAL PROCESSING UNIT

(75) Inventors: Jeong Ig Song, Seoul (KR); Joong Baik Kim, Seoul (KR); Seung Wook Lee, Suwon-si (KR); Soon Wan Kwon, Gwangju-si (KR)

(73) Assignee: Samsung Electronics Co., Ltd (KR)

( * ) Notice: Subject to any disclaimer, the term of this patent is extended or adjusted under 35 U.S.C. 154(b) by 422 days.

(21) Appl. No.: 12/896,503

(22) Filed: Oct. 1, 2010

(65) Prior Publication Data
US 2011/0083134 A1    Apr. 7, 2011

(30) Foreign Application Priority Data
Oct. 1, 2009    (KR) .................. 10-2009-0093696

(51) Int. Cl.
G06F 9/455    (2006.01)
G06F 9/46    (2006.01)
G06F 9/50    (2006.01)

(52) U.S. Cl.
CPC ............ *G06F 9/5077* (2013.01); *G06F 9/5088* (2013.01); *G06F 9/5094* (2013.01); *Y02B 60/142* (2013.01); *Y02B 60/162* (2013.01); *Y02B 60/167* (2013.01)

(58) Field of Classification Search
None
See application file for complete search history.

(56) References Cited

U.S. PATENT DOCUMENTS

| | | | | |
|---|---|---|---|---|
| 6,957,435 B2* | 10/2005 | Armstrong et al. | ............ | 718/104 |
| 7,734,833 B2* | 6/2010 | McKenney | ........................ | 710/5 |
| 7,748,003 B2* | 6/2010 | McKenney et al. | ........... | 718/102 |
| 2002/0156824 A1* | 10/2002 | Armstrong et al. | ........... | 709/104 |
| 2003/0055864 A1 | 3/2003 | Armstrong et al. | | |
| 2005/0132362 A1 | 6/2005 | Knauerhase et al. | | |
| 2006/0150185 A1* | 7/2006 | McKenney et al. | ........... | 718/102 |
| 2007/0083871 A1* | 4/2007 | McKenney | .................... | 718/105 |
| 2007/0204266 A1* | 8/2007 | Beaty | .................. | G06F 9/45558 718/1 |
| 2008/0184229 A1 | 7/2008 | Rosu et al. | | |
| 2008/0244222 A1* | 10/2008 | Supalov et al. | .................. | 712/13 |
| 2009/0198946 A1* | 8/2009 | Ebata | ..................... | G06F 3/0608 711/171 |
| 2009/0217283 A1* | 8/2009 | Anand et al. | ................... | 718/104 |
| 2010/0037038 A1* | 2/2010 | Bieswanger et al. | ......... | 712/220 |
| 2010/0115049 A1* | 5/2010 | Matsunaga | ........... | G06F 3/0626 709/216 |
| 2010/0186010 A1* | 7/2010 | Chalemin et al. | ................. | 718/1 |
| 2010/0332658 A1* | 12/2010 | Elyashev | ..................... | 709/226 |

FOREIGN PATENT DOCUMENTS

| | | |
|---|---|---|
| KR | 1020040028805 | 4/2004 |
| KR | 1020060108711 | 10/2006 |

OTHER PUBLICATIONS

Korean Office Action dated Aug. 26, 2015 issued in counterpart application No. 10-2009-0093696, 9 pages.

\* cited by examiner

*Primary Examiner* — Tammy Lee
(74) *Attorney, Agent, or Firm* — The Farrell Law Firm, P.C.

(57) ABSTRACT

A method and apparatus for managing a virtual processor including resources for operating application through a real central processing unit, which includes determining a utilization of a plurality of real CPUs to which a plurality of virtual processors are divided to be allocated; and repartitioning the virtual processors and reallocating the repartitioned virtual processor to at least part of the real CPUs, when the utilization of any one of the real CPUs is at a threshold or less.

18 Claims, 6 Drawing Sheets

APPARATUS AND METHOD FOR MANAGING VIRTUAL PROCESSING UNIT

PRIORITY

This application claims priority under 35 U.S.C. §119(a) to an application filed in the Korean Intellectual Property Office on Oct. 1, 2009 and assigned Serial No. 10-2009-0093696, the contents of which are incorporated herein by reference.

BACKGROUND OF THE INVENTION

1. Field of the Invention

The present invention relates generally to an apparatus and a method for a virtualization, and more particularly, to an apparatus and a method for managing a virtual processor including resources for operating an application through a hardware.

2. Description of the Related Art

Generally, an Operating System (OS) provides an interface between hardware and various applications in various signal processing apparatuses. That is, the OS manages resources for operating applications through the hardware. Moreover, the virtual interface between the hardware and each application is implemented in the OS through virtualization. Currently, virtualization implements a plurality of virtual processors by dividing resources for each application, and allocates them to the hardware. However, in the signal-processing unit, virtual processors are statically allocated or dynamically allocated to the hardware. Thus, in the static allocation of the virtual processors, stability can be guaranteed and a relative high-speed operation speed can be obtained when a signal-processing unit operates applications. However, a problem arises in that the virtual processor has a low efficiency in use. And, in the dynamic allocation of the virtual processors, the efficiency of use of the virtual processor can be improved in the signal-processing unit. However, there is a problem in that it is difficult to secure stability in operating applications and the operating speed is decreased. Accordingly, it is difficult to guarantee the performance capability of a given level in the signal-processing unit. This problem becomes more serious when a plurality of operating systems are driven in the signal-processing unit.

SUMMARY OF THE INVENTION

The present invention has been made in view of at least the above-described problems, and provides a method for managing a virtual processor consisting of resources for operating an application through an actual processor.

In accordance with an aspect of the present invention, a method of managing a virtual processor including resources for operating application through a real Central Processing Unit (CPU) includes: determining a utilization of a plurality of real CPUs to which a plurality of virtual processors are divided to be allocated; and repartitioning the virtual processors and reallocating the repartitioned virtual processor to at least part of the real CPUs, when the utilization of any one of the real CPUs is at a threshold or less.

In accordance with another aspect of the present invention, an apparatus of managing a virtual processor includes: a plurality of virtual processors, which are comprised of resources for operating respective applications: a plurality of real CPUs to which the plurality of virtual processors are divided to be allocated; a controller, which determines a utilization of the real CPUs; and a virtualization manager which repartitions the virtual processors and reallocates the repartitioned virtual processor to at least part of the real CPUs, when the utilization of any one of the real CPUs is at a threshold or less.

Accordingly, the virtual processor management apparatus and method can repartition virtual processors in the virtual processor management apparatus according to the utilization of the processors, and can reallocate them to processors. That is, in the virtual processor management apparatus, virtual processors between non-real-time processors can be merged, or virtual processors between a non-real-time processor and a real-time processor can be merged. Thus, in the virtual processor management apparatus, the utilization of the processors can be actually guaranteed with a given level. Additionally, in the merge of virtual processors, the power of part of the processors is controlled, so that the power consumption can be decreased in the virtual processor management apparatus. Accordingly, in the signal-processing unit, including a virtual processor management apparatus, the performance capability can be guaranteed with a given level.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE INVENTION

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
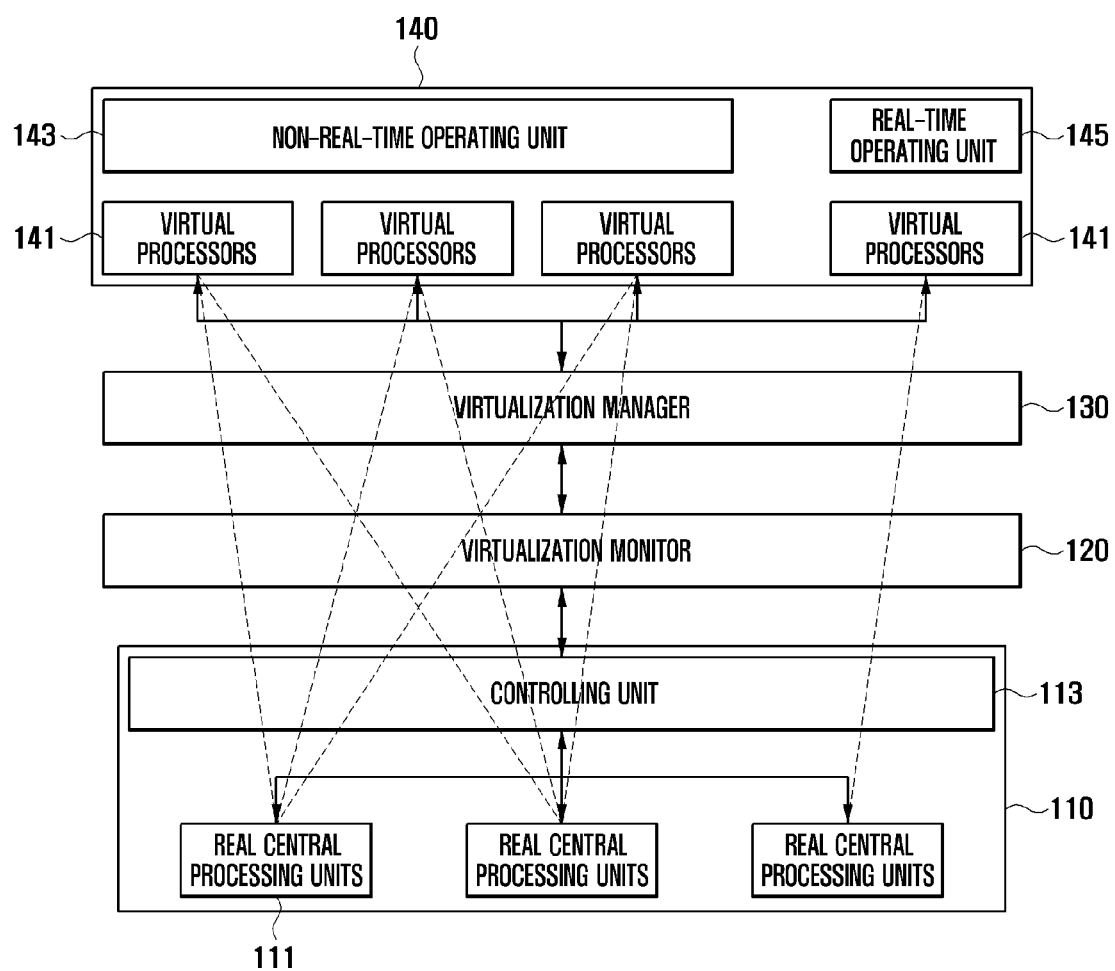
FIG. 1 is a block diagram illustrating a configuration of a virtual processor management apparatus according to an embodiment of the present invention.
Figure 2:
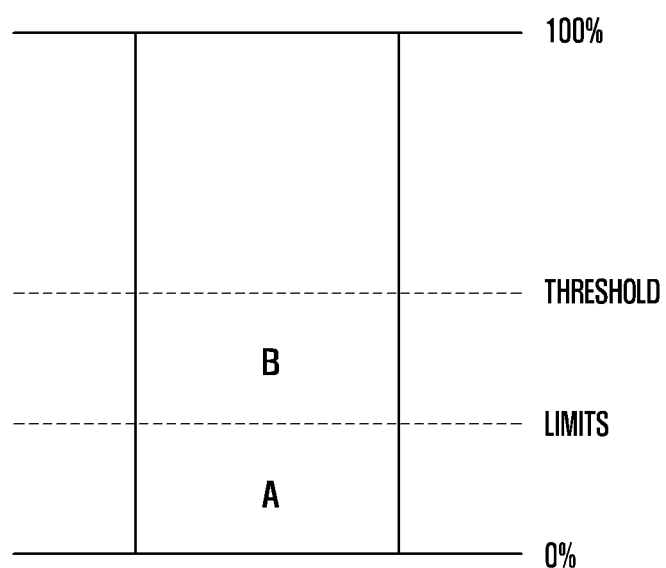
FIG. 2 is a diagram illustrating a virtual processor management technology according to an embodiment of the present invention.

FIG. 1 is a block diagram illustrating a configuration of a virtual processor management apparatus according to an embodiment of the present invention. FIG. 2 is a diagram illustrating a virtual processor management technology according to an embodiment of the present invention. Currently, in the present embodiment, it is assumed that a virtual processor management apparatus is mounted within a signal-processing unit.

Referring to FIG. 1, the virtual processor management apparatus 100 of the embodiment includes a hardware 110, a virtualization monitor 120, a virtualization manager 130, and an operating system 140. The hardware 110 includes a plurality of real CPUs 111 and a controlling unit 113. The real CPUs 111 substantially perform the function of operating applications. This real CPUs 111 can include at least one real-time processor for processing a signal at the point of time of occurrence and a plurality of non-real-time processors for accumulating and processing a signal generated for a given time interval. The real CPUs 111 are made of physical resources such as processor, memory, input-output device, and network card. The controlling unit 113 controls the real CPUs 111. Specifically, the controlling unit 113 controls the power of real CPUs 111. That is, the controlling unit 113 is able to drive at least one of the real CPUs 111 by supplying power thereto, and likewise is able to stop the power supply to at least one of the real CPUs 111.

More specifically, the controlling unit 113 converts at least one of the real CPUs 111 into a sleep mode to stop driving. Moreover, the controlling unit 113 periodically determines the utilization of real CPUs 111. The virtualization monitor 120 divides the real CPUs 111 by application. That is, the virtualization monitor divides physical resources into virtual resource for each application. For Example, the virtualization monitor 120 can divide the physical resources of one real CPU into virtual resources for at least one application. Here, the virtualization monitor 120 can be a Virtual Machine Monitor (VMM) or a hypervisor.

The virtualization manager 130 maps virtual resources to the real CPUs 111. That is, the virtualization manager 130 allocates virtual resources for each application to the real CPUs 111, and the virtualization manager 130 determines the utilization of virtual resources. The virtualization manager 130 can determine the utilization of virtual resources in respective real CPUs 111 in consideration of the occupancy of virtual resources for each application. Moreover, the virtualization manager 130 determines the reallocation of virtual resources according to the utilization of real CPUs 111.

Referring to FIG. 2, the virtualization manager 130 can compare the utilization of real CPUs 111 with preset reference values, that is, limits and a threshold. Here, the virtualization manager 130 additionally considers the utilization of virtual resources, so that it can decide the reallocation of virtual resources. Moreover, the virtualization manager 130 can reallocate virtual resources. That is, the virtualization manager 130 can merge virtual resources of the plurality of real CPUs 111 into one real CPU 111, or can divide virtual resources of one real CPU 111 into the plurality of real CPUs 111.

The OS 140 includes a plurality of virtual processors 141, a non-real-time operating unit 143, and a real-time operating unit 145. Virtual processors 141 map virtual resources according to each application. The virtual processors 141 can correspond to applications on a one-to-one basis, are made of a plurality of virtual tasks for each application, and virtual resources for each application constitute each virtual task.

Thereafter, virtual processors 141 are allocated to the real CPUs 111. Here, the virtual processors 141 are allocated to at least one of the non-real-time processor and the real-time processor unit in the real CPUs 111. The non-real-time operating unit 143 uses virtual processors 141 to provide an interface between the non-real-time processors and applications in the real CPUs 111. The real-time operating unit 145 uses virtual processor 141 to provide an interface between the real-time processors and applications in the real CPUs 111.

As described above, the virtual processor management apparatus 100 according to an embodiment of the present invention repartitions the virtual processors 141 according to the utilization of real CPUs 111 and can reallocate it to the real CPUs 111.

Figure 3:
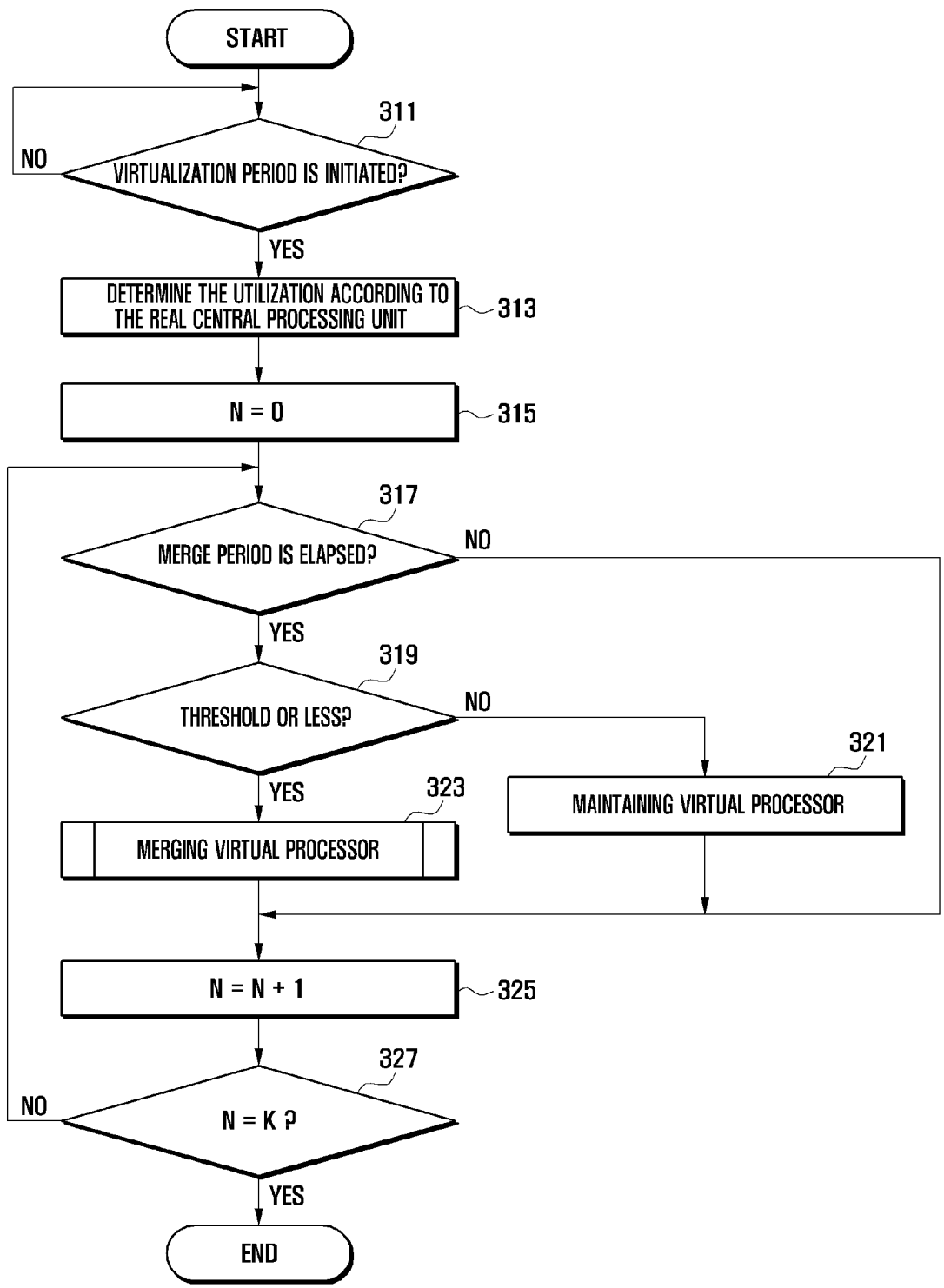
FIG. 3 is a flowchart illustrating a virtual processor management process according to an embodiment of the present invention.

FIG. 3 is a flowchart illustrating a virtual processor management process according to an embodiment of the present invention.

Referring to FIG. 3, when the virtualization period is initiated, the controlling unit 113 senses it, and starts to determine the utilization according to the real CPU 111 in step 313. When a plurality of virtual processor 141 are divided for allocation to the real CPUs 111, the controlling unit 113 can determine the utilization of real CPUs 111. The controlling unit 113 previously stores the virtualization period according to a preset given time interval, and performs functions based on the virtualization period.

Here, if the number of the real CPUs 111 is K, an index N can be given to the real CPUs 111 with 0 to K−1. Alternatively, in the real CPUs 111, an index may not be given to the real-time processor, but index can be limitedly given to the non-real-time processor. That is, when the number of non-real-time processors is K, an index can be given to the non-real-time processors with 0 to K−1.

In step 315, the controlling unit 113 decides one of the real CPUs 111. At this time, one of the real CPUs 111 corresponds to the index of 0. The controlling unit 113 determines whether a merge period is elapsed in one of the real CPUs 111 in step 317. At this time, the controlling unit 113 stores the merge period according to the preset given time interval, and the merge period is applied from a different point of time for each real CPU 111. Here, the merge period can be made of a time interval, which is longer than at least one virtualization period, and can be made of a different time interval for each real CPU 111. Then, when it is determined that the merge period is elapsed in one of the real CPUs 111 in step 317, the controlling unit 113 compares one utilization of the real CPUs 111 with a preset threshold (as illustrated in FIG. 2) in step 319.

When it is determined that the utilization of one of the real CPUs 111 exceeds the threshold in step 319, the controlling unit 113 maintains virtual processors 141 through the virtualization manager 130 in step 321. That is, the controlling unit 113 and the virtualization manager 130 maintain the state where virtual processors 141 are allocated to the real CPUs 111. Alternatively, when it is determined that the utilization of one of the real CPUs 111 is at the threshold or less at step 319, the controlling unit 113 merges virtual processors 141 through the virtualization manager 130 in step 323. At this time, the controlling unit 113 and the virtualization manager 130 repartition the virtual processors 141 and reallocate it to the real CPUs 111.

Figure 4:
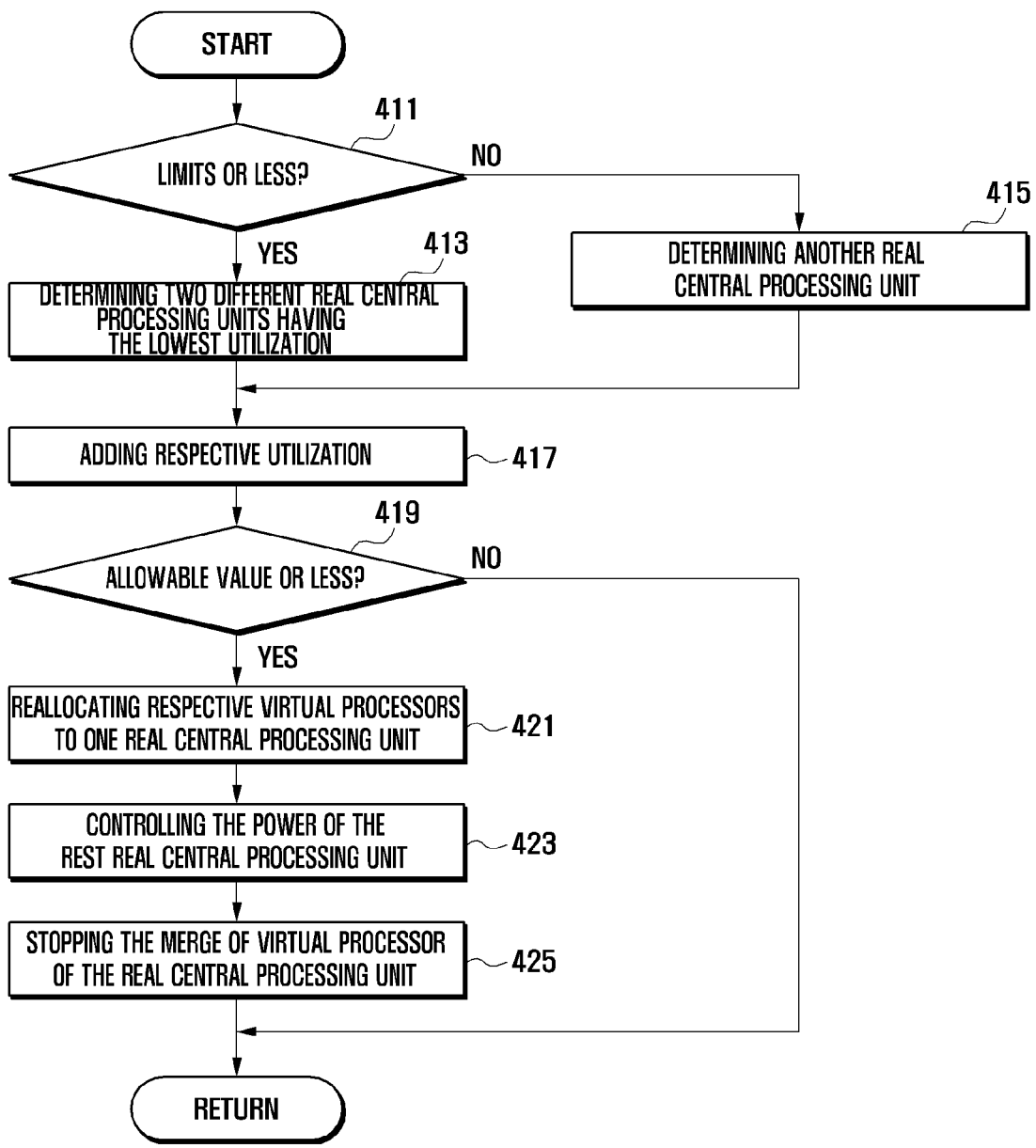
FIG. 4 is a flowchart illustrating a virtual processor merge process of FIG. 3.

FIG. 4 is a flowchart illustrating a virtual processor merge process of FIG. 3.

Referring to FIG. 4, when it is determined that the utilization of one of the real CPUs 111 is at the threshold or less in step 319, the controlling unit 113 compares the utilization of one of the real CPUs 111 and preset limits as shown in FIG. 2 in step 411. Referring to FIG. 2, the controlling unit 113 checks whether the utilization of one of the real CPUs 111 belongs to an area 'A' ranging from 0 to the preset limits. Alternatively, referring to FIG. 2, the controlling unit 113 checks whether the utilization of one of the real CPUs 111 belongs to an area 'B' ranging from the limits to the threshold. Then, when it is determined that the utilization of one of the real CPUs 111 is the threshold or less in step 411, the controlling unit 113 determines two real CPUs 111 from the hardware 110 in step 413. When the utilization of one of the real CPUs 111 ranges from 0 to the limit, the controlling unit 113 excludes one of the real CPUs 111 from the hardware 110. The controlling unit 113 can further exclude another real CPUs 111 in which the merge period is not elapsed from the hardware 110. Moreover, the controlling unit 113 determines two real CPUs 111 having lowest utilization among the rest real CPUs 111.

When it is determined that the utilization of one of the real CPUs 111 exceeds limits in step 411, the controlling unit 113 determines another real CPU 111 from the hardware 110 in step 415. That is, when the utilization of one of the real CPUs 111 belongs to the area 'B', the controlling unit 113 excludes one of the real CPUs 111 from the hardware 110. The controlling unit 113 can further exclude the other real CPUs 111 in which the merge period is not elapsed from the hardware 110. Moreover, the controlling unit 113 determines another one having the lowest utilization among the rest real CPUs 111. In step 417, the controlling unit 113 produces a result value by adding the utilization of one of the real CPUs 111 to the utilization of at least one of the others. The controlling unit 113 compares the result value with a given predetermined allowable value in step 419. At this time, when it is determined that the result value is an allowable value or less in step 419, the controlling unit 113 reallocates the virtual processors 141 of one and at least another one the real CPUs 111 to one of the real CPUs 111 in step 421. That is, the virtualization manager 130 elects one or at least another one of the real CPUs 111, so that the virtual processors 141 of the one and at least another one of the real CPUs 111 are transferred to the elected real CPU 111 among one and at least another one the real CPUs 111.

In step 423, the controlling unit 113 controls the power of one or at least another one of the real CPUs 111. That is, the controlling unit 113 turns the power off corresponding to the non-elected real CPU 111 among one and at least another one the real CPUs 111 by using the power supply. In step 425, the controlling unit 113 stops the merge of virtual processor 141 in one of the real CPUs 111 or at least another one at current time, and returns to FIG. 3. The controlling unit 113 monitors the elapsed time from current time. Moreover, although not shown, when the merge period expires, the controller 141 re-supplies the power to the non-elected real CPU 111 to turn on.

When it is determined that the result value exceeds the allowable value in step 419, the controlling unit 113 returns to FIG. 3. That is, the controlling unit 113 determines that it impossible to merge one of the real CPUs 111 with at least another one virtual processor 141. The controlling unit 113 maintains the state where virtual processors 141 are allocated to the real CPUs 111 through the virtualization manager 130.

In the meantime, in the present embodiment, it was illustrated that the controlling unit 113 reallocates one of the real CPUs 111 and at least one another virtual processor 141 to one of the real CPUs 111 and at least one of the others. However, the present invention is not limited to this. Although the controlling unit 113 does not selectively merge the virtual processors 141 from at least two among the real CPUs 111, the present invention can still be implemented.

For example, although not shown, when the utilization of one of the real CPUs 111 exceeds preset limits, the controlling unit 113 compares the number of virtual processors 141 in the operating system 140 with the number of the real CPUs 111 in the hardware 110. When the number of virtual processors 141 exceeds the number of the real CPUs 111, the controlling unit 113 merges at least part of the virtual processors 141 so that the number of the virtual processors 141 may be identical to the number of the real CPUs 111. The controlling unit 113 can perform a grouping for the virtual processors 141 according to a certain rule. Here, the controlling unit 113 may store a rule for performing a grouping based on the utilization of the virtual processor 141.

Moreover, because there is the same number of virtual processors 141 and real CPUs 111 are constituted by the same number, the controlling unit 113 corresponds the virtual processors 141 to the real CPUs 111 on a one-to-one basis and reallocates each of the virtual processors 141 to each of the real CPUs 111. Thereafter, the controlling unit 113 controls respective operating frequencies of the real CPUs 111, and returns to FIG. 3. At this time, the controlling unit 113 can apply Dynamic Voltage and Frequency Scaling (DVFS) function.

When it is determined that the merge period has not elapsed in one of the real CPUs 111 in step 317, the controlling unit 113 determines another one among the real CPUs 111 in step 325.

Alternatively, after maintaining virtual processor 141 in step 321, or merging the virtual processors 141 at step 323, the controlling unit 113 determines another one among the real CPUs 111 at step 325. The controlling unit 113 increases the index corresponding to one of the real CPUs 111 as much as 1, can determine another one of corresponding indices in the real CPUs 111. In step 327, controlling unit 113 determines whether another one exists in the real CPUs 111.

That is, the controlling unit 113 determines whether the decision of the merge or maintaining of virtual processor 141 is completed in all real CPUs 111 of the hardware 110. At this time, when it is determined that another one exists among the real CPUs 111 in step 327, the controlling unit 113 repeatedly performs steps 317 to 327. Moreover, when it is determined that another one does not exist among the real CPUs 111 at step 327, the controlling unit 113 terminates the virtual processor 141 management process. Although the present embodiment has been described with the controlling unit 113 merge into at least two virtual processors 141 among the real CPUs 111 according to the utilization of one of the real CPUs 111, however, the present invention is not limited to this. That is, the present invention can be implemented in such a manner that the controlling unit 113 separates the virtual processors 141 into at least two of the real CPUs 111 according to the utilization of one of the real CPUs 111. For example, when the utilization of one of the real CPUs 111 is a preset separation value or more, the controlling unit 113 can determine at least another one having the lowest utilization among the real CPUs 111. Then, the controlling unit 113 separates a part of one virtual processor 141 of the real CPUs 111 into at least another one of the real CPUs 111 and can transfer.

Figure 5:
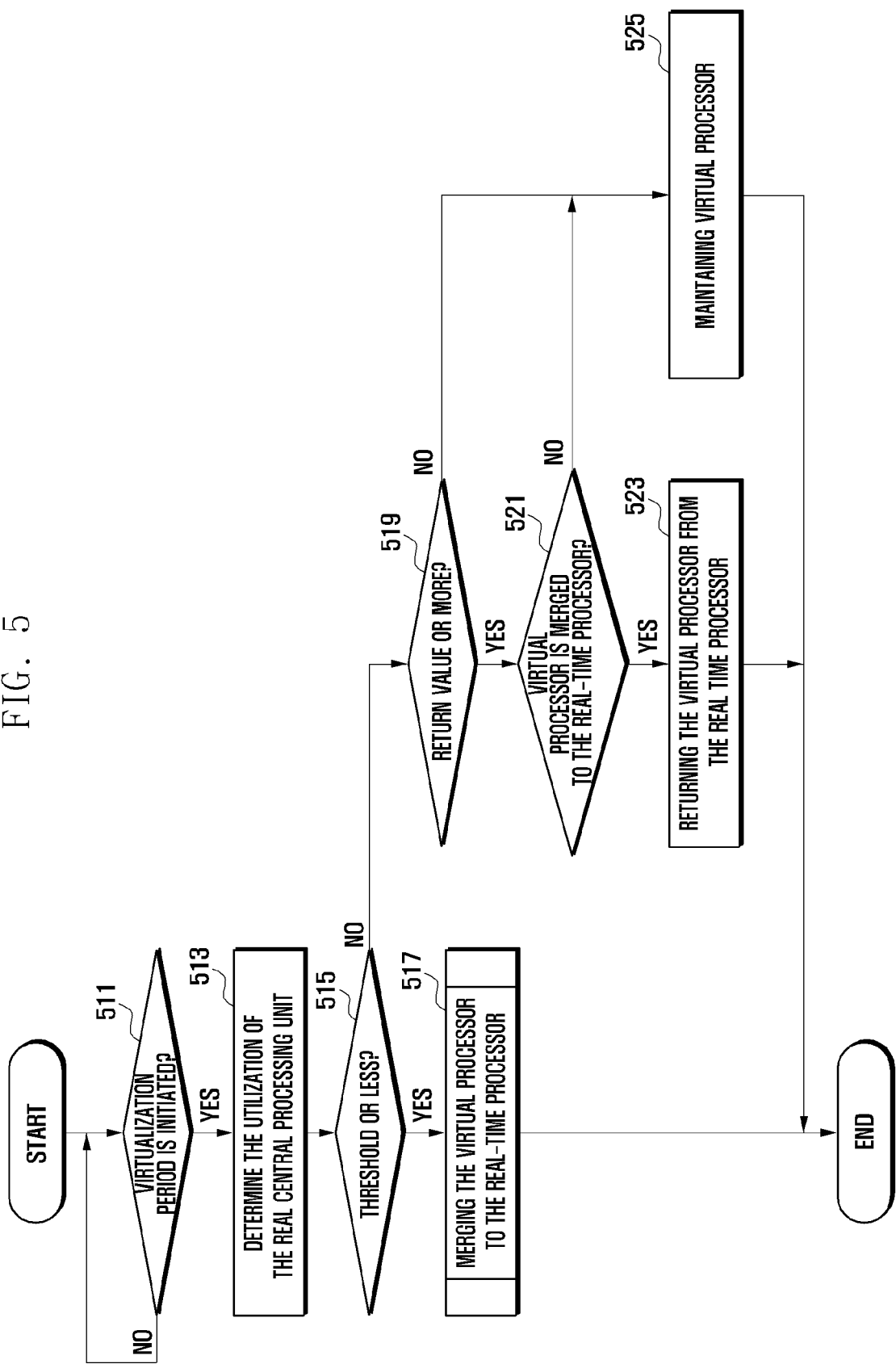
FIG. 5 is a flowchart illustrating a virtual processor management process according to another embodiment of the present invention.

FIG. 5 is a flowchart illustrating a virtual processor management process according to another embodiment of the present invention.

Referring to FIG. 5, when the virtualization period is initiated in step 511, the controlling unit 113 senses it, and starts to determine the utilization of a real-time processor in the real CPUs 111 in step 513. At this time, in the state where a plurality of virtual processor 141 are divided to be allocated to the real CPUs 111, the controlling unit 113 can determine the utilization of the real-time processor. And the controlling unit 113 previously stores the virtualization period according to a preset given time interval, and performs function based on the virtualization period.

In step 515, the controlling unit 113 compares the utilization of the real-time processor with a preset threshold as shown in FIG. 2. When it is determined that the utilization of the real-time processor is at a threshold or less in step 515, the controlling unit 113 performs the process of merging the virtual processors 141 through the virtualization manager 130 in step 517. That is, the controlling unit 113 and the virtualization manager 130 repartition the virtual processors 141 of the non-real-time processors and reallocate it to the real-time processor. Then, the controlling unit 113 terminates the management process of the virtual processor 141.

Figure 6:
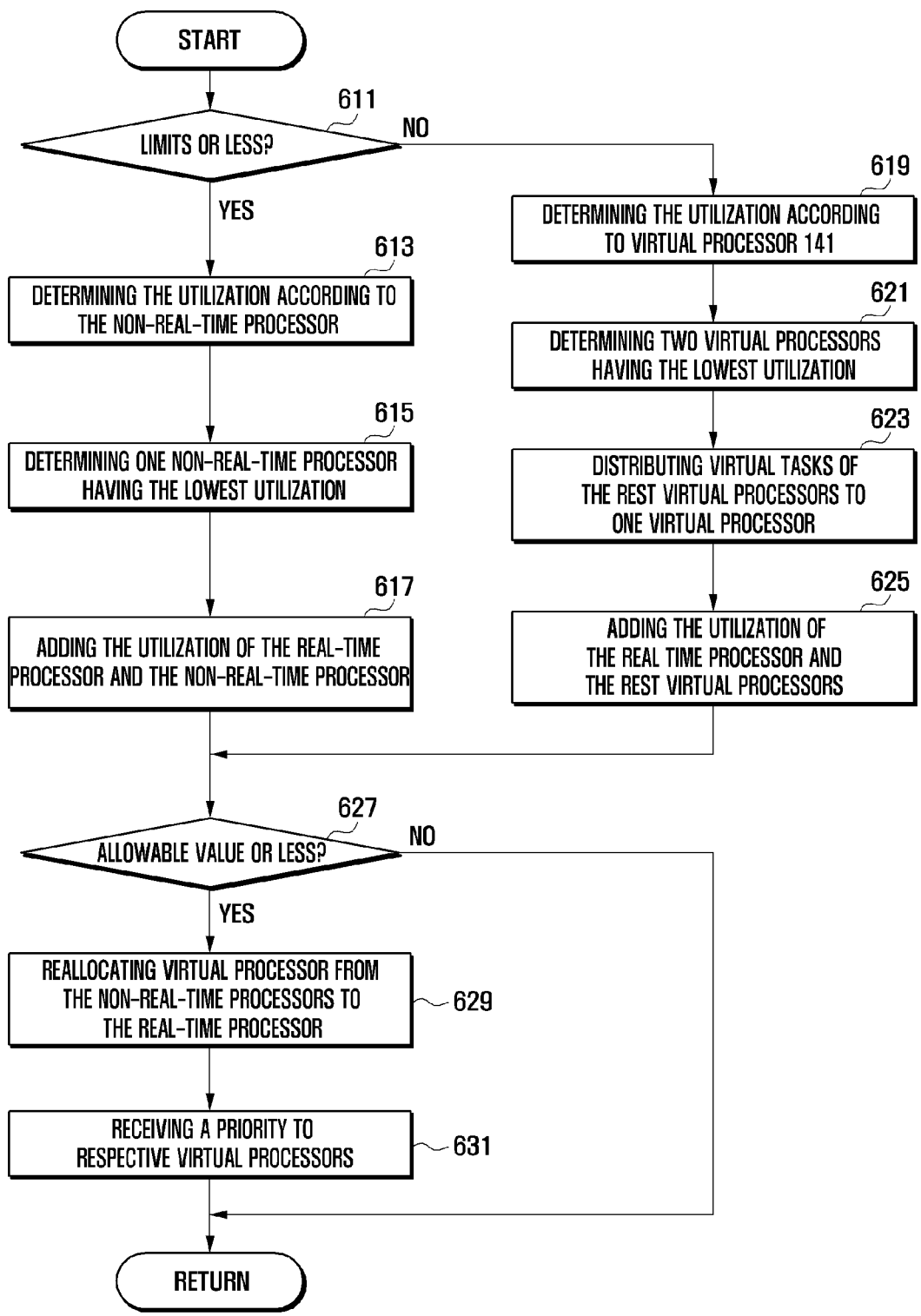
FIG. 6 is a flowchart illustrating a virtual processor merge process of FIG. 5.

FIG. 6 is a flowchart illustrating a virtual processor merge process of step 517 in more detail.

Referring to FIG. 6, when it is determined that the utilization of one of the real-time processor is the threshold or less in step 515, the controlling unit 113 compares the utilization of the real-time processor and preset limits as illustrated in FIG. 2 at step 611. The controlling unit 113 checks whether the utilization of the real-time processor belongs to an area 'A' (FIG. 2) ranging from 0 to the limits. Alternatively, the controlling unit 113 checks whether the utilization of the real-time processor belongs to an area 'B' (FIG. 2) ranging from the limits to the threshold.

When it is determined that the utilization of the real-time processor is the threshold or less at step 611, the controlling unit 113 determines the utilization according to the non-real-time processor in the real CPUs 111 in step 613. Where a plurality of virtual processors 141 are divided for allocation to the real CPUs 111, the controlling unit 113 can determine the utilization of non-real-time processor. Thereafter, the controlling unit 113 determines one non-real-time processor of the real CPUs 111 in step 615. That is, when the utilization of the real-time processor ranges from 0 to a threshold, the controlling unit 113 determines any one of the non-real-time processor having the lowest utilization among the real CPUs 111. In step 617, the controlling unit 113 produces a result value by adding the real-time processor to the utilization of any one of the non-real-time processor respectively.

When it is determined that the utilization of the real-time processor exceeds a threshold in step 611, the controlling unit 113 determines the utilization according to virtual processor 141 through the virtualization manager 130 in step 619. The controlling unit 113 can determine the utilization of each virtual processor 141 corresponding to the non-real-time processor. That is, the controlling unit 113 determines the utilization according to the non-real-time processor, can determine the utilization of the virtual processor 141 by using the occupancy classified by virtual processor 141 in respective non-real-time processor. Then, the controlling unit 113 determines two of the virtual processors 141 in step 621.

At this time, the controlling unit 113 determines two virtual processors having the lowest utilization in the virtual processors 141. The controlling unit 113 distributes virtual tasks from two of the virtual processors 141 through the virtualization manager 130 in step 623. That is, the virtualization manager 130 transfers a part of one virtual task of two virtual processors 141 to the rest of the virtual processors 141. Here, the rest of the virtual processors 141 correspond to one of the non-real-time processors. Moreover, the controlling unit 113 produces the result value by adding the utilization of the real-time processor to each utilization of the other two virtual processors 141 in step 625.

In step 627, the controlling unit 113 compares the result value with a given allowable value. At this time, when it is determined that the result value is the allowable value or less at step 627, the controlling unit 113 reallocates one virtual processor 141 of the non-real-time processors through the virtualization manager 130 in step 629. When a plurality of virtual processors 141 are allocated any one of the non-real-time processors, the controlling unit 113 can reallocate at least one of any one virtual processors 141 among the non-real-time processor. After the controlling unit 113 receives a priority with respective virtual processors 141 of the real-time processor through the virtualization manager 130, the process returns to FIG. 5 in step 631. That is, the controlling unit 113 receives a priority according to the order allocated to the real-time processor among the virtual processors 141. For example, the controlling unit 113 can receive a low priority when the order allocated to the real-time processor is late.

When it is determined that the result value exceeds the allowable value at step 627, the process 113 returns to FIG. 5. That is, the controlling unit 113 determines that it is impossible to merge the virtual processors 141 of the real-time processor and the non-real-time processor in the real CPUs 111. The controlling unit 113 maintains the state where virtual processors 141 are allocated to the real CPUs 111 through the virtualization manager 130.

When it is determined that the utilization of the real-time processor exceeds a threshold in step 515, the controlling unit 113 compares the utilization of the real-time processor with a preset return value in step 519. Here, the controlling unit 113 stores the return value which is set higher than a threshold. When it is determined that the utilization of the real-time processor is a return value or more at step 519, the controlling unit 113 determines whether the merge of the virtual processor 141 with the real-time processor is accomplished from the non-real-time processor through the virtualization manager 130 in step 521. And when it is determined that the merge of the virtual processor 141 with the real-time processor is accomplished, the controlling unit 113 returns the virtual processor 141 from the real-time processor to the non-real-time processor in step 523. Then, the controlling unit 113 terminates the management process of virtual processor 141.

When it is determined that the utilization of the real-time processor is below a return value in step 519, or the merge of the virtual processor 141 with the real-time processor is not accomplished, the controlling unit 113 maintains the virtual processor 141 through the virtualization manager 130 in step 525. That is, the controlling unit 113 and the virtualization manager 130 maintain the state where virtual processors 141 are allocated to the real CPUs 111.

According to an embodiment of the present invention, the virtual processors are repartitioned in the virtual processor management apparatus according to the utilization of the real CPUs and can reallocate it to the processors. That is, in the virtual processor management apparatus, the virtual processors between the non-real-time processor can be merged, or the virtual processors between the non-real-time processor and the real-time processor can be merged. Accordingly, in the virtual processor management apparatus, the utilization of the real CPUs can be guaranteed with a certain level. Furthermore, merging the virtual processors, the power of a part of the real CPUs is controlled, so that the power consumption can be reduced in the virtual processor management apparatus. Accordingly, in a signal-processing unit including a virtual processor management apparatus, the performance capability can be guaranteed with a specific level.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for managing virtual processors allocated to real processors, the method comprising:
   determining utilization of a plurality of real processors;
   identifying a first real processor having a lowest utilization among the plurality of real processors;
   reallocating at least one virtual processor to the first real processor;
   determining utilization of each processor of a plurality of virtual processors;

identifying at least two virtual processors having a combined lowest utilization among the plurality of virtual processors; and transferring a part of a virtual task of each of the at least two virtual processors to the plurality of virtual processors, except for the at least two virtual processors.

2. The method of claim 1, further comprising:

determining whether utilization of the first real processor is less than or equal to a first threshold; and determining to reallocate the at least one virtual processor to the first real processor, if the utilization of the first real processor is less than or equal to the first threshold.

3. The method of claim 1, further comprising:

identifying a second real processor having a highest utilization among the plurality of real processors;

determining whether utilization of the second real processor is greater than or equal to a second threshold;

determining whether at least two virtual processors are allocated to the second real processor, if the utilization of the second real processor is greater than or equal to the second threshold;

reallocating at least one of the at least two virtual processors allocated to the second real processor to one of the plurality of real processors other than the second real processor, if the at least two virtual processors are allocated to the second real processor.

4. The method of claim 1, wherein determining the utilization of the plurality of real processors is performed periodically.

5. The method of claim 1, wherein reallocating the at least one virtual processor to the first real processor comprises:

determining whether a predetermined time duration has elapsed, after a previous reallocation of at least one virtual processor to the first real processor; and determining to reallocate the at least one virtual processor to the first real processor, if the predetermined time duration has elapsed, wherein the at least one virtual processor is not reallocated to the first real processor, if the predetermined time duration has not elapsed.

6. The method of claim 1, further comprising:

identifying a utilization of each real processor of a set of real processors among the plurality of real processors;

adding a utilization of at least two real processors having a lowest combined utilization; and reallocating at least one virtual processor allocated to the at least two real processors of the set of real processors, if the added utilization the at least two real processors of the set of real processors is less than or equal to a third threshold, wherein the at least two real processors of the set of real processors includes the first real processor.

7. The method of claim 6, further comprising turning off a power of at least one real processor among the identified set of real processors.

8. The method of claim 1, wherein the plurality of virtual processors, except for the at least two virtual processors, includes at least one non-real-time processor.

9. The method of claim 1, further comprising:

determining utilization of a plurality of non-real-time processors among the plurality of real processors;

identifying a non-real-time processor having a lowest utilization among the plurality of non-real-time processors; and reallocating at least one virtual processor allocated to the identified non-real-time processor to a real-time processor, wherein the real-time processor is part of the plurality of real processors.

10. An apparatus for managing virtual processors allocated to real processors, the apparatus comprising:

a plurality of virtual processors including resources for operating applications;

a plurality of real processors; and a controller configured to:

determine utilization of the plurality of real processors;

identify a first real processor having a lowest utilization among the plurality of real processors;

reallocate at least one of the plurality of virtual processors to the first real processor;

determine utilization of each processor of the plurality of virtual processors;

identify at least two virtual processors having a combined lowest utilization among the plurality of virtual processors; and transfer a part of a virtual task of each of the at least two virtual processors to the plurality of virtual processors, except for the at least two virtual processors.

11. The apparatus of claim 10, wherein the controller is further configured to:

determine whether utilization of the first real processor is less than or equal to a first threshold; and determining to reallocate at least one of the plurality of virtual processors to the first real processor, if the utilization of the first real processor is less than or equal to the first threshold.

12. The apparatus of claim 10, wherein the controller is further configured to:

identify a second real processor having a highest utilization among the plurality of real processors;

determine whether utilization of the second real processor is greater than or equal to a second threshold;

determine whether at least two of the plurality of virtual processors are allocated to the second real processor, if the utilization of the second real processor is greater than or equal to the second threshold; and reallocate at least one of the at least two of the plurality of virtual processors allocated to the second real processor to one of the plurality of real processors other than the second real processor, if the at least two of the plurality of virtual processors are allocated to the second real processor.

13. The apparatus of claim 10, wherein the controller is further configured to periodically determine the utilization of the plurality of real processors.

14. The apparatus of claim 10, wherein the controller is further configured to:

determine whether a predetermined time duration has elapsed, after a previous reallocation of at least one of the plurality of virtual processors to the first real processor;

reallocate at least one of the plurality of the virtual processors to the first real processor, if the predetermined time duration has elapsed; and prevent reallocation of the at least one of the plurality of virtual processors to the first real processor, if the predetermined time duration has not elapsed.

15. The apparatus of claim 10, wherein the controller is further configured to:

identify a utilization of each real processor of a set of real processors among the plurality of real processors;

add a utilization of at least two real processors having a lowest combined utilization; and reallocate at least one virtual processor allocated to the at least two real processors of the set of real processors, if the added utilization of the at least two real processors of the set of real processors is less than or equal to a third threshold, wherein the at least two real processors of the set of real processors includes the first real processor.

16. The apparatus of claim 15, wherein the controller is further configured to turn off a power of at least one real processor among the identified set of real processors.

17. The apparatus of claim 10, wherein the plurality of virtual processors, except for the at least two virtual processors, includes at least one non-real-time processor.

18. The apparatus of claim 10, wherein the controller is further configured to:

determine utilization of a plurality of non-real-time processors among the plurality of real processors;

identify a non-real-time processor having a lowest utilization among the plurality of non-real-time processors; and reallocate at least one virtual processor allocated to the identified non-real-time processor to a real-time processor, wherein the real-time processor is part of the plurality of real processors.

\* \* \* \* \*